United States Patent
Dervaux et al.

(10) Patent No.: US 7,658,591 B2
(45) Date of Patent: Feb. 9, 2010

(54) COOLING LAYOUT FOR A TURBINE BLADE, TURBINE BLADE INCLUDED THEREIN, TURBINE AND AIRCRAFT ENGINE EQUIPPED THEREWITH

(75) Inventors: Alexandre Dervaux, Paris (FR); Jean-Michel Bernard Guimbard, Cely en Biere (FR); Damien Gilbert Andre Redon, Issy les Moulineaux (FR); Pascal Bertrand Yves Claude Papot, Le Chatelet en Brie (FR)

(73) Assignee: SNECMA, Paris (FR)

( * ) Notice: Subject to any disclaimer, the term of this patent is extended or adjusted under 35 U.S.C. 154(b) by 484 days.

(21) Appl. No.: 11/556,867

(22) Filed: Nov. 6, 2006

(65) Prior Publication Data

US 2007/0122281 A1    May 31, 2007

(30) Foreign Application Priority Data

Nov. 7, 2005    (FR) .................................. 05 53357

(51) Int. Cl.
*F01D 5/08*    (2006.01)
(52) U.S. Cl. ..................................... 415/115; 416/96 A
(58) Field of Classification Search ................. 415/115; 416/96 R, 96 A
See application file for complete search history.

(56) References Cited

U.S. PATENT DOCUMENTS

| | | | | |
|---|---|---|---|---|
| 5,120,192 A | * | 6/1992 | Ohtomo et al. | 415/115 |
| 5,259,730 A | * | 11/1993 | Damlis et al. | 416/96 A |
| 5,533,864 A | * | 7/1996 | Nomoto et al. | 416/96 A |
| 5,695,321 A | | 12/1997 | Kercher | |
| 6,874,988 B2 | * | 4/2005 | Tiemann | 415/115 |
| 6,997,675 B2 | * | 2/2006 | Dube et al. | 415/115 |
| 2003/0035726 A1 | | 2/2003 | Tiemann | |

FOREIGN PATENT DOCUMENTS

EP    0 541 207 A1    5/1993

OTHER PUBLICATIONS

Database Inspec [Online], Database Accession No. 7673232, XP-002395911, Shou-Shing Hsieh, et al., "Impingement cooling in a rotating curved square annular duct with crossflow effect from rib-roughened surfaces" vol. 39, No. 2, 2003, 1 page.

* cited by examiner

*Primary Examiner*—Ninh H Nguyen
(74) *Attorney, Agent, or Firm*—Oblon, Spivak, McClelland, Maier & Neustadt, L.L.P.

(57) ABSTRACT

A layout for cooling a blade having a cavity surrounded by an internal wall including cooling fins which are spaced apart from each other by a pitch (p) and each have a thickness (e). The blade has, inside the cavity, a jacket passed through by emission holes each having a diameter (d). When the jacket is in place in the cavity of the blade, and in respect of the critical operating point of the turbine engine, each emission hole of the jacket is opposite a place on the internal wall of the blade which is located between cooling fins.

10 Claims, 1 Drawing Sheet

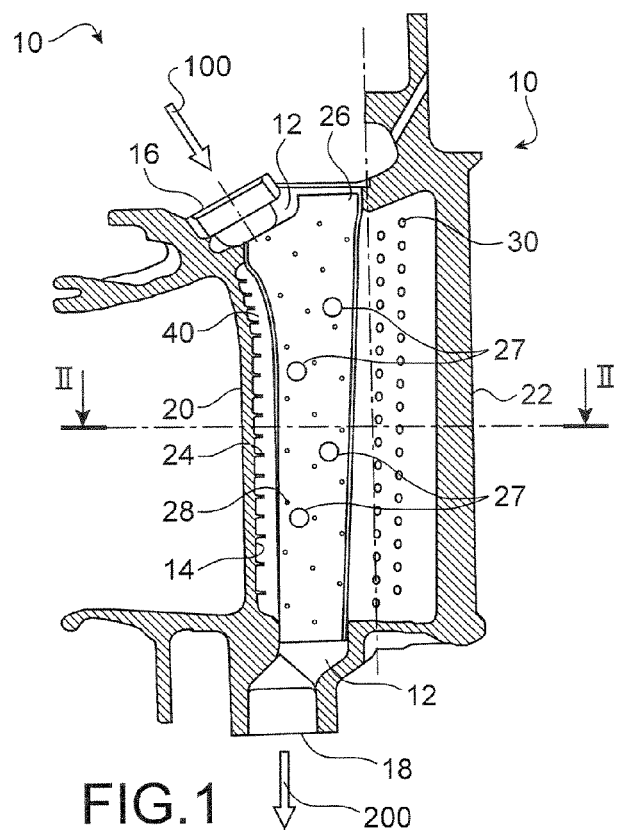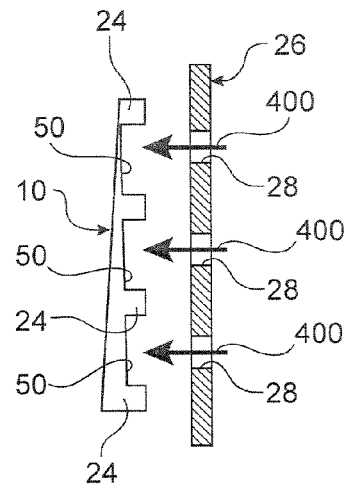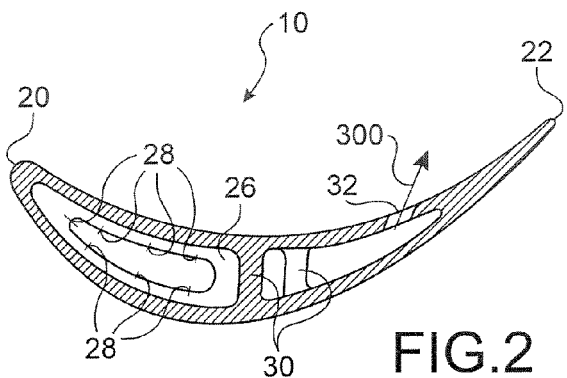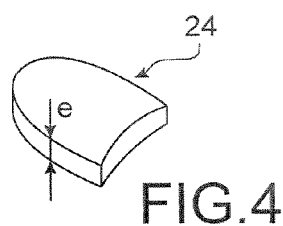
FIG.1
FIG.3
FIG.2
FIG.4

COOLING LAYOUT FOR A TURBINE BLADE, TURBINE BLADE INCLUDED THEREIN, TURBINE AND AIRCRAFT ENGINE EQUIPPED THEREWITH

TECHNICAL FIELD

The present invention relates to the technical field of cooling the blades of a turbine in a turbine engine, particularly an aircraft engine.

More specifically, the invention relates to the technical field of cooling a turbine blade by jets of cooling air blasted onto an internal wall of the blade, through a jacket placed inside the blade.

The invention applies to a layout of cooling fins arranged on the internal wall of the blade and holes for the emission of jets of cooling air maid through the jacket.

More particularly, the invention applies to a layout of the relative position of the fins and emission holes, so as to improve blade cooling.

The invention also relates to a blade fitted with such a cooling layout, this blade being able to be a fixed distributor blade or a runner.

The invention also relates to a turbine comprising at least one such cooling layout and/or one such blade.

The invention lastly relates to an aircraft engine equipped with at least one such cooling layout and/or one such blade and/or one such turbine.

PRIOR ART

Devices are already known for cooling the blades of a turbine stage in a turbine engine.

The blades are cooled by forced convection of cooling air circulating through a cavity formed in the blades. Cooling air is bled from a colder part of the turbine engine, for example from the compressor. This cooling air is brought into each blade through one of the ends thereof, for example its radially external end. This cooling air circulates in the blade and flows out through the opposite end, for example its radially internal end. Sometimes, the cooling air is brought into the blade through its two ends.

When the blades are fitted with a jacket arranged in the cavity of the corresponding blade, the cooling air is also able to circulate from the inside of the jacket outwards therefrom, through the emission holes maid through the jacket.

This cooling air is blasted onto the internal wall of the blade cavity through the emission holes in the jacket, in the form of jets, and reaches this wall at different impact points.

There is a known technique of arranging the cooling fins on the internal wall of the blade cavity, so as to increase the heat exchange surface between this internal wall and the blasted jets of air. The presence of these fins allows the heat exchange surface between the jets of cooling air and the internal wall of the blade to the increased.

In the prior art cooling devices which are described above, the quality of blade cooling stems from the heat exchange surface between the internal wall of the blades and the jets of cooling air which are blasted onto this internal wall, in other words from the number and size of the fins arranged on the internal wall of each blade.

In these prior art cooling devices described above, the cooling air jet inlet position relative to the position of the fins is random. As a result, the cooling of the corresponding blade is not uniform over the area under consideration. Subsequently, during the most disadvantageous phases in terms of thermo-mechanical resistance of the components and particularly in respect of the critical operating point of the turbine engine, the random nature of the position of the fins relative to the position of the cooling air impacts may lead to premature wear and tear of the distributor and of the turbine runner.

DISCLOSURE OF THE INVENTION

The present invention proposes an improvement in devices for cooling the fixed or movable blades of a turbine in a turbine engine, by jets of cooling air, each blade being fitted with at least one cavity and at least one jacket arranged inside this cavity. Cooling occurs via jets of cooling air blasted onto the internal wall of the blade through emission holes maid in the jacket. Cooling fins are present on the internal wall of the blade, in an area thereof which is opposite the jets of cooling air and on which the impact points of these jets of cooling air are found.

According to the invention, a particular layout is proposed of the cooling fins relative to the emission holes made in the jacket, which allows the above-mentioned drawback of prior art cooling devices to be overcome.

According to a first aspect, the invention relates to a layout for cooling a turbine blade in a turbine engine, said blade being fitted with at least one cavity surrounded by an internal wall comprising cooling fins which are spaced apart from each other by a pitch p and each have a thickness e, said blade being fitted with a jacket, arranged inside said cavity and passed through by emission holes each having a diameter d, said cooling layout being characterised in that, when the jacket is in place in the blade cavity, and in respect of the critical operating point of the turbine engine, each jacket emission hole is opposite a place on the internal wall of the blade located between cooling fins.

In particular, when the jacket is in place in the blade cavity, and in respect of the critical operating point of the turbine engine, the pitch p and the thickness e of the cooling fins satisfy the relationship:

$$p/e \geq 3 \qquad (1).$$

In particular, when the jacket is in place in the blade cavity, and in respect of the critical operating point of the turbine engine, at least one place on the internal wall of the blade located between cooling fins is opposite at least one jacket hole.

In other words, when the jacket is in place in the blade cavity, and in respect of the critical operating point of the turbine engine, no fin on the internal wall of the blade is opposite a hole in the jacket.

According to a second aspect, the invention relates to a turbine engine turbine blade, comprising a cooling layout according to the first aspect of the invention.

According to a third aspect, the invention relates to a turbine engine turbine, comprising at least one blade according to the second aspect of the invention.

According to a fourth aspect, the invention relates to an aircraft engine, comprising at least one turbine blade according to the second aspect of the invention.

With the cooling layout according to the invention, more uniform turbine blade cooling is obtained than with the prior art cooling layouts which have been discussed previously. As a result, the lifespan of the turbine is increased.

With the cooling layout according to the invention, more effective turbine blade cooling is obtained than with the prior art cooling layouts which have been discussed previously.

According to one particular embodiment of the aircraft engine according to the fifth aspect of the invention, said aircraft engine comprising a turbine blade cooling layout according to the first aspect, is characterised in that it comprises a cooling air bleeding device which brings cooling air into the inside of a jacket arranged in a cavity of a least one blade according to the first aspect, said cooling air then being blasted onto the internal wall of the blade through the emission holes maid in said jacket in the form of a cooling flow which has a Reynolds number $R_e$ the characteristic length of which is the diameter d of the emission holes, and which satisfies the relationship:

$$R_e < 10,000 \quad (2).$$

According to an even more particular embodiment of the aircraft engine according to the fifth aspect of the invention, said aircraft engine comprising a turbine blade cooling layout, said blade being fitted with at least one cavity surrounded by an internal wall comprising cooling fins which are spaced apart from each other by a pitch p and each have a thickness e, said blade being fitted with a jacket, arranged inside said cavity and passed through by emission holes each having a diameter d, said aircraft engine additionally comprising a cooling air bleeding device which brings cooling air into the inside of the jacket, said cooling air then being blasted onto the internal wall of the blade through the emission holes maid in said jacket, in the form of a cooling flow which has a Reynolds number $R_e$ the characteristic length of which is the diameter d of the emission holes, is characterised that, when the jacket is in place in the blade cavity, and in respect of the critical operating point of the turbine engine, each emission hole in the jacket is located opposite a place on the internal wall of the blade located between cooling fins, and in that the pitch p, the thickness e, and the Reynolds number $R_e$ satisfy the relationships:

$$p/e \geq 3 \quad (1),$$

and $$R_e < 10,000 \quad (2).$$

It has been observed that with a cooling layout according to the invention, turbine blade cooling is optimised during the most disadvantageous operating phases in terms of the thermo-mechanical resistance of the components.

In particular, in respect of the critical operating point of the turbine engine, it has been observed that the mean heat exchange coefficient between the cooling flow and the cooling fins is increased by 10% relative to heat exchange coefficients encountered with prior art cooling devices.

BRIEF DESCRIPTION OF THE DRAWINGS

The invention will be better understood by reading the following detailed description of embodiments of the invention, given by way of illustration and by no means restrictively, with reference to the appended drawings, wherein:

FIG. 1 shows, in longitudinal cross-section, a distributor blade, showing the jacket arranged inside the cavity and the emission holes made on said jacket;

FIG. 2 shows the same distributor blade, in transverse cross-section through the line II-II in FIG. 1;

FIG. 3 is a diagram showing, in longitudinal cross-section, the relative position of the fins of the internal wall of the blade and the emission holes maid through the jacket;

FIG. 4 is a perspective view of a fin on the internal wall of the blade.

DETAILED DISCLOSURE OF PARTICULAR EMBODIMENTS

It is briefly restated that a turbine is made up of a succession of stages each comprising a distributor and a runner, the distributor being a grid of fixed blades which rectify a flow of air passing through the working section of the turbine engine, and the runner carrying movable blades.

With reference first of all to FIGS. 1 and 2, a blade 10 of a turbine engine turbine distributor is shown.

The blade 10 is fitted with a cavity 12 and an internal wall 14 surrounding the cavity 12. The blade 10 comprises a first end 16 and a second end 18, which, in the example shown in FIG. 1, are its radially external and radially internal ends. The two ends 16, 18 are open and communicate with the cavity 12 of the blade 10.

The blade 10 comprises a leading edge 20 and a trailing edge 22.

On its internal wall 14, the blade 10 is equipped with cooling fins 24, which are particularly arranged towards the leading edge 20. As shown in FIG. 4, the cooling fins 24 are presented substantially in the form of a component cut from a plate and having a rounded profile.

These cooling fins 24 are characterised by the following dimensions:
    a thickness e (see FIG. 4), and
    a pitch p, which corresponds to a mean distance between two adjacent cooling fins.

In the cavity 12 is arranged a jacket 26, which is presented in the form of a preformed and welded metal sheet, substantially conical in shape. The ends of the jacket rest on the internal wall 14. The body of the jacket 26, located between the ends thereof, is not in contact with the internal wall 14. There is, particularly towards the leading edge 20 of the blade 10, a gap 40 between the jacket 26 and the internal wall 14. Only a few lobes 27 on the surface of the jacket 26 are in contact with the internal wall 14 and allow the jacket 26 to be positioned and held in the cavity 12.

The jacket 26 is equipped with emission holes 28, which are made by boring through the thickness of the jacket 26. These emission holes 28 are characterised by a diameter d.

In the example shown in FIGS. 1 and 2, the blade 10 also comprises keepers 30 which pass through the cavity 14 in a transverse direction thereof and through orifices 32 arranged towards its trailing edge 22. The keepers 30 and the through orifices 32 play no part in the context of the present invention.

During the operation of the turbine engine, there is a technique of cooling the blade 10 of the turbine distributor by bleeding cooling air from a colder part of the turbine engine, for example a compressor, and by introducing this cooling air into the cavity 12 of each blade 10.

In FIG. 1, the arrow 100 represents a cooling airflow introduced into the jacket 26 arranged in the cavity 12 through the first end 16, and the arrow 200 represents a part of this cooling airflow being discharged from the jacket 26 through the second end 18. This airflow which passes through the jacket 26 allows other parts of the engine to be supplied with cooling air.

A significant part of this cooling airflow penetrates into the jacket 26 from the first end 16, and is discharged therefrom towards the internal wall 14 of the blade 10 through the emission holes 28 provided through the jacket 26, in the form of transverse flows. These transverse flows are shown in FIG. 3 by the arrows 400.

The cooling air is discharged through the emission holes 28 in the form of air jets which are blasted onto the internal wall 14 at impact points 50 thereof.

When the jacket 26 is in place in the cavity 12, and in respect of the most disadvantageous operating conditions from the thermo-mechanical point of view in a turbine engine, the cooling fins 24 and the emission holes 28 are arranged, on the internal wall 14 of the blade 10 and on the jacket 26 arranged in the blade 10 respectively, in such a way that the impact points 50 of the cooling air jets are located between the cooling fins 24, as is shown in FIG. 3. In other words, at the critical operating point, the cooling air jets do not arrive on cooling fins 24, but between cooling fins 24. A single jet of cooling air or several jets of cooling air may reach a place located between cooling fins 24. The most disadvantageous operating conditions from a thermo-mechanical point of view in the turbine engine, and particularly its critical operating point, are well-known to those skilled in the art. They equate to high temperatures of between 700° C. and 1100° C., at which the mechanical properties of materials are corrupted. It is in these most disadvantageous operating conditions that the cooling of the blade 10 must be the most effective.

It has been observed that the relative positioning of the cooling fins on the internal wall 14 of the blade 10 and of the emission holes 28 through the jacket 26 is optimised when the following relationships are satisfied:

$$p/e \geq 3 \quad (1)$$

and $$R_e < 10,000 \quad (2),$$

where p represents the distance between two adjacent cooling fins 24, e represents the mean thickness of the cooling fins 24, d represents the diameter of the emission holes 28, and $R_e$ represents the Reynolds number of the cooling airflow through the emission holes 28.

The previous detailed description relates to blades in a turbine engine turbine distributor. However, the invention also applies to the blades of a turbine engine turbine runner.

EMBODIMENT OF THE EXAMPLE

The blade is made from a super-alloy. The jacket is made from a heat resistant alloy.

For a cooling airflow at emission hole level passing through the jacket and with a Reynolds number $R_e$=50,000, the following dimensions, corresponding to the critical operating point, are applicable:

p=3.5 mm
e=0.5 mm
d=0.53 mm

In practice, a model is maid by digital simulation in the following way:
- a "hot" model is designed, in other words at the critical operating point, by introducing as parameters the required temperatures set as a function of the materials used, and by selecting the values p, e, d above;
- then a shift is made from a "hot" model to a "cold" model by modifying the temperature parameters,
- then the values of p, e, d of this "cold" model are taken, which correspond to the readings and to the relative positions of the fins and emission holes of the cold manufactured components.

Digital simulation is carried out using C.A.D. (Computer Assisted Design) software which has a testing under temperature module. The above example was maid with the Scale Factor module of Catia C.A.D. software.

The invention claimed is:

1. A cooling layout for a turbine engine distributor blade,
said blade being fitted with at least one cavity surrounded by an internal wall comprising cooling fins which are spaced apart from each other by a pitch (p) and each have a thickness (e),
said blade being fitted with a jacket, and passed through by emission holes each having a diameter (d), wherein, when the jacket is in place in the cavity of the blade, and in respect of the critical operating point of the turbine engine, each emission hole of the jacket is opposite a place on the internal wall of the blade which is between cooling fins,
wherein said jacket does not contact said cooling fins and contacts said internal wall via lobes on a surface of the jacket.

2. A cooling layout according to claim 1, wherein, when the jacket is in place in the cavity of the blade, and in respect of the critical operating point of the turbine engine, at least one place on the internal wall of the blade which is between cooling fins is opposite at least one emission hole of the jacket.

3. A cooling layout according to claim 1, wherein, in respect of the critical operating point of the turbine engine, no cooling fin on the internal wall of the blade is opposite an emission hole of the jacket.

4. A blade of a turbine engine turbine, wherein said blade comprises a cooling layout according to claim 1.

5. A turbine engine comprising at least one blade according to claim 4.

6. An aircraft engine comprising at least one blade according to claim 4.

7. An aircraft engine comprising a cooling air bleeding device which brings cooling air into the inside of a jacket arranged in a cavity of at least one blade according to claim 5, said cooling air being then blasted onto the internal wall of the blade through emission holes made in said jacket in the form of a cooling flow which has a Reynolds number ($R_e$) the characteristic length of which is the diameter (d) of the emission holes and which satisfies the relationship:

$$Re < 10,000. \quad (2)$$

8. A blade according to claim 4, wherein said thickness (e) of the cooling fins is constant.

9. A cooling layout for a turbine engine distributor blade,
said blade being fitted with at least one cavity surrounded by an internal wall comprising cooling fins which are spaced apart from each other by a pitch (p) and each have a thickness (e),
said blade being fitted with a jacket, and passed through by emission holes each having a diameter (d), wherein, when the jacket is in place in the cavity of the blade, and in respect of the critical operating point of the turbine engine, each emission hole of the jacket is opposite a place on the internal wall of the blade which is between cooling fins,
wherein, when the jacket is in place in the cavity of the blade, and in respect of the critical operating point of the turbine engine, the pitch (p) and the thickness (e) of the cooling fins satisfy the relationship:

$$p/e \geq 3. \quad (1)$$

10. An aircraft engine, comprising a layout for cooling a turbine blade, said blade being fitted with at least one cavity surrounded by an internal wall comprising cooling fins, wherein said cooling fins are spaced apart from each other by a pitch (p) and each have a thickness (e), said blade being fitted with a jacket, arranged inside said cavity and passed through by emission holes, wherein said emission holes each have a diameter (d), said aircraft engine additionally comprising a cooling air bleeding device which brings cooling air into the inside of said jacket, said cooling air then being blasted onto the internal wall of the blade through the emission holes made in said jacket, in the form of a cooling flow which has a Reynolds number ($R_e$) the characteristic length of which is the diameter (d) of the emission holes, wherein, when the jacket is in place in the cavity of the blade, and in respect of the critical operating point of the turbine engine, each emission hole of the jacket is opposite a place on the internal wall of the blade which is between cooling fins, and in that the pitch (p), the thickness (e) and the Reynolds number ($R_e$) satisfy the relationships:

$$p/e \geq 3 \quad (1)$$

and $$Re < 10,000. \quad (2)$$

* * * * *

UNITED STATES PATENT AND TRADEMARK OFFICE
CERTIFICATE OF CORRECTION

PATENT NO. : 7,658,591 B2
APPLICATION NO. : 11/556867
DATED : February 9, 2010
INVENTOR(S) : Alexandre Dervaux et al.

Page 1 of 1

It is certified that error appears in the above-identified patent and that said Letters Patent is hereby corrected as shown below:

In column 1, line 17, change "maid" to --made--;
line 46, change "maid" to --made--.

In column 4, line 3, change "maid" to --made--.

In column 5, line 56, change "maid" to --made--.

In column 6, line 3, change "maid" to --made--.

Signed and Sealed this

Twenty-seventh Day of July, 2010

David J. Kappos
*Director of the United States Patent and Trademark Office*